United States Patent [19]

Dighton

[11] Patent Number: 4,580,599

[45] Date of Patent: Apr. 8, 1986

[54] VALVE ASSEMBLY FOR RELIEVING PRESSURE ON A PROCESS STRUCTURE

[75] Inventor: Gaylon L. Dighton, Baton Rouge, La.

[73] Assignee: The Dow Chemical Company, Midland, Mich.

[21] Appl. No.: 758,935

[22] Filed: Jul. 25, 1985

[51] Int. Cl.⁴ ............................................. F16K 11/16
[52] U.S. Cl. ................................... 137/597; 137/315; 137/614.11; 137/866
[58] Field of Search .................. 137/315, 597, 614.11, 137/637.2, 862, 866

[56] References Cited

U.S. PATENT DOCUMENTS

| | | | |
|---|---|---|---|
| 2,145,575 | 1/1939 | Zwickel | 137/866 X |
| 2,503,187 | 4/1950 | Bagsar | 137/597 |
| 2,708,947 | 5/1955 | Heller | 137/315 X |
| 2,720,214 | 10/1955 | Rupp et al. | 137/875 X |
| 3,007,489 | 11/1961 | Biddle | 137/614.11 |
| 3,088,480 | 5/1963 | Yancey | 137/315 X |
| 4,372,334 | 2/1983 | Paul, Jr. | 137/876 X |

*Primary Examiner*—A. Michael Chambers
*Assistant Examiner*—John C. Fox
*Attorney, Agent, or Firm*—V. Dean Clausen

[57] ABSTRACT

The invention is a valve assembly designed for relieving pressure on a process structure, such as a reactor vessel or a pipeline. The valve structure consists of two separate pressure relief units, and each unit includes a pressure relief valve that is positioned between an inlet valve and an outlet valve. A single mechanical actuator means is used to open and close both pairs of valves, so that when one pair of inlet and outlet valves is fully closed, the other pair of inlet and outlet valves is fully open.

2 Claims, 4 Drawing Figures

VALVE ASSEMBLY FOR RELIEVING PRESSURE ON A PROCESS STRUCTURE

BACKGROUND OF THE INVENTION

The invention relates to a valve assembly that is designed for relieving pressure on a process structure, such as a reactor vessel.

In chemical process plants many different types of pressure relief systems are installed on pressure vessels, such as reactors or storage tanks, or on other structures that carry fluids under high pressure, such as pipelines. Many of the pressure relief systems use a double arrangement of pressure relief valves and associated piping to provide a safety factor for relieving an overpressure condition. But, some of these systems are not satisfactory from the standpoint of safety. The unsafe condition is usually created when an operator makes a mistake in his sequence for opening or closing the valve on the inlet or discharge side of the pressure relief valves.

As an example of a typical double-valve pressure relief system, a three-way valve is mounted on the outlet fitting of a reactor. The other two ports in the three-way valve are each connected into the inlet side of a pressure relief valve. An outlet valve or Hamer blind is connected into the discharge side of each pressure relief valve, and each outlet valve is connected by appropriate piping into a flare header or some other vent system. After the system has been installed, it may be necessary to isolate the pressure relief valves, one at a time, from the reactor and the flare header to perform routine maintenance operations, such as replacing or repairing the relief valve or other parts. The isolation step involves aligning the three-way valve to the appropriate pressure relief valve and closing the outlet valve or Hamer blind on the discharge side of the other pressure relief valve, so that the relief valve is isolated from both the reactor and vent header.

After the repair and/or replacement job is completed the outlet valve or Hamer blind is opened, and the three-way valve is aligned to the pressure relief valve that has been repaired. Fluid in the reactor can then pass through the three-way valve, the pressure relief valve, and the outlet valve or Hamer blind into the flare header, if an overpressure condition should develop in the reactor. But, if the operator should forget to open the outlet valve, or the Hamer blind, a hazardous situation can occur. The hazard is created by the fact that the pressurized fluid cannot flow through the other pressure relief valve and the outlet valve, because the port in the three-way valve that communicates with the other pressure relief valve is closed.

The use of a Hamer blind to isolate the pressure relief valve has another drawback. It is a manual operation in which wrenches and other hand tools must be used, and air usually gets into the lines when the flange bolts are loosened to insert the blind. If the air mixes with highly flammable gases, such as methane or propane, it can result in explosion and fire. Another disadvantage of the system described above is the use of a three-way valve ahead of the pressure relief valve. When fluid flows through a three-way valve it must follow a tortuous path and the pressure drop is quite substantial.

The present invention overcomes most of the problems described above. The invention provides a valve assembly which includes two pressure relief valves, each being positioned between an inlet valve and an outlet valve. A single mechanical actuator means is used to open and close both pairs of valves, so that when one pair of inlet and outlet valves is fully closed, the other pair of inlet and outlet valves is fully open.

SUMMARY OF THE INVENTION

The valve assembly of this invention is useful for relieving pressure on a process structure, such as a reactor vessel or a pipeline. The valve assembly comprises a valve frame that has a front wall, rear wall and two end walls that are each joined to the front and rear wall. The valve assembly includes two pressure relief units. Each of these units is made up of an inlet valve, a discharge valve and a pressure relief valve. The inlet and discharge valves of one pressure relief unit are mounted on the front wall of the valve frame, and the pressure relief valve connects the inlet valve to the discharge valve. The inlet and discharge valves of the other pressure relief unit are mounted on the rear wall of the valve frame, and the pressure relief valve connects the inlet valve to the discharge valve.

A connector member is positioned inside the valve frame. The connector member is engaged by an actuator unit that is capable of moving the connector member back and forth inside the valve frame. Each of the inlet valves and discharge valves have a valve stem that is connected to a coupler means and each coupler engages the connector member. Both inlet valves are connected into an inlet line that carries the fluid away from the process structure. The discharge valves are each connected into a discharge line that carries the fluid to a disposal point, such as a flare header, or some other type of a vent system.

In the operation of the valve assembly, the actuator unit can move the connector member to a first position that opens one pair of the inlet and discharge valves and closes the other pair of inlet and discharge valves. Since each of these pairs of valves makes up one pressure relief unit, any overpressure condition in the process structure can be relieved by allowing the fluid to pass through one of these units to the disposal point.

DESCRIPTION OF THE INVENTION

Figure 1:
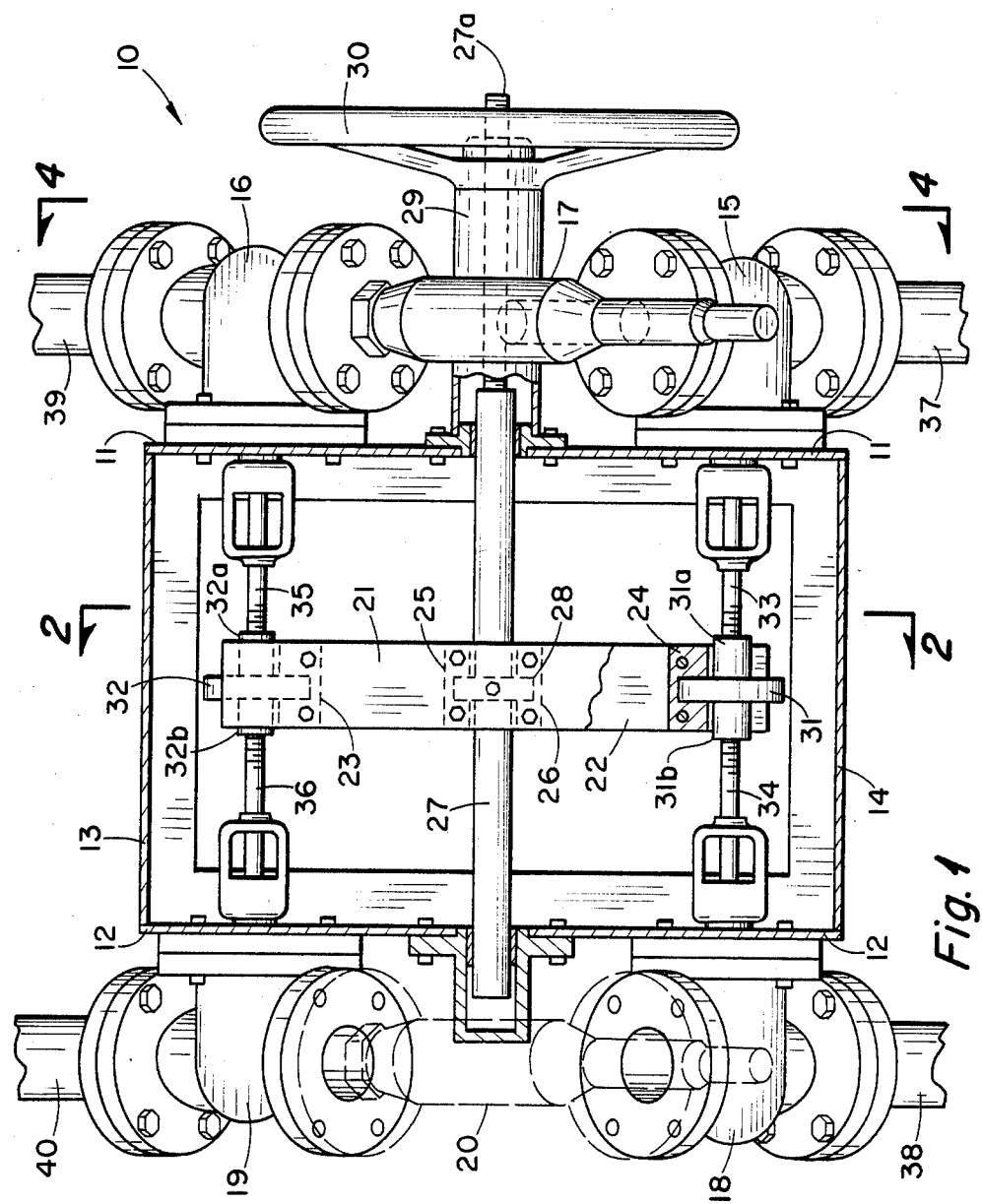
FIG. 1 is front elevation view, partly in section, of the valve assembly of this invention.

Looking at FIG. 1, the valve assembly of this invention is illustrated generally by numeral 10. The valve assembly includes a valve frame that has a front wall 11, a rear wall 12, and end walls 13 and 14, that are each joined to the front and rear wall. The valve assembly includes two pressure relief units. One of these units is made up of an inlet valve 16, a discharge valve 15, and a pressure relief valve 17. The inlet and discharge valves are mounted on the front wall 11 of the valve frame and the pressure relief valve connects the inlet valve to the discharge valve.

Figure 2:
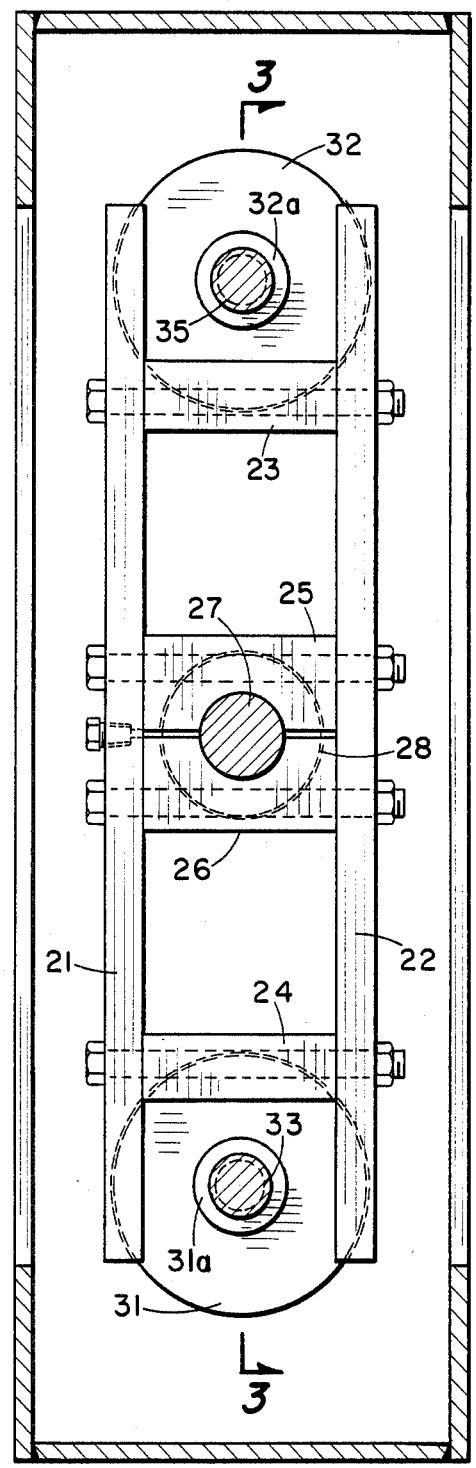
FIG. 2 is a plan view, partly in section, of the connector member and valve frame of the valve assembly, as taken along line 2—2 of FIG. 1.

The other pressure relief unit consists of an inlet valve 19, a discharge valve 18 and a pressure relief valve 20, which is shown in hidden outline. The inlet and discharge valves are mounted on the rear wall 12 of the valve frame and the pressure relief valve connects the inlet valve to the discharge valve. A connector member is positioned inside the valve frame. This member is made up of several parts, as best shown in FIG. 2. The parts of the connector member include two flat, spaced-apart bars 21 and 22, that are joined at one end by a crosswise piece 23, and at the other end by a similar crosswise piece 24. At the center, bars 21 and 22 are joined by two crosswise pieces 25 and 26, which are spaced apart.

Figure 3:
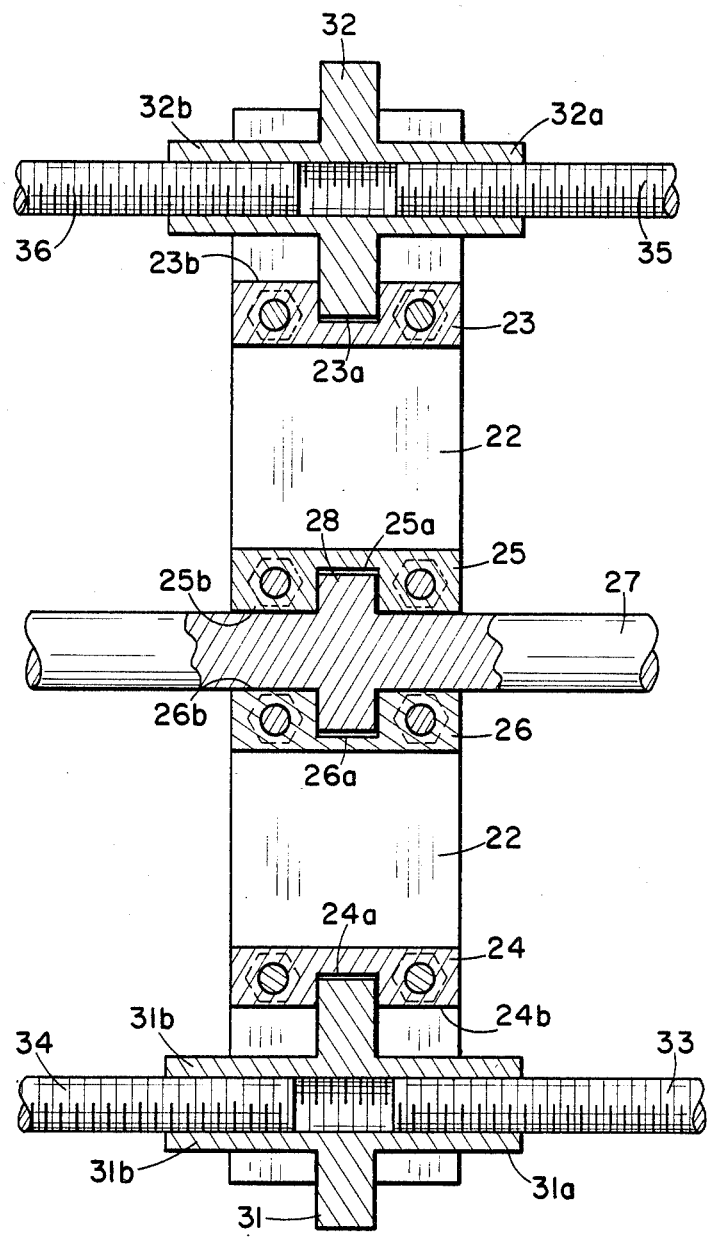
FIG. 3 is view, partly in section, as taken on line 3—3 of FIG. 2.
Figure 4:
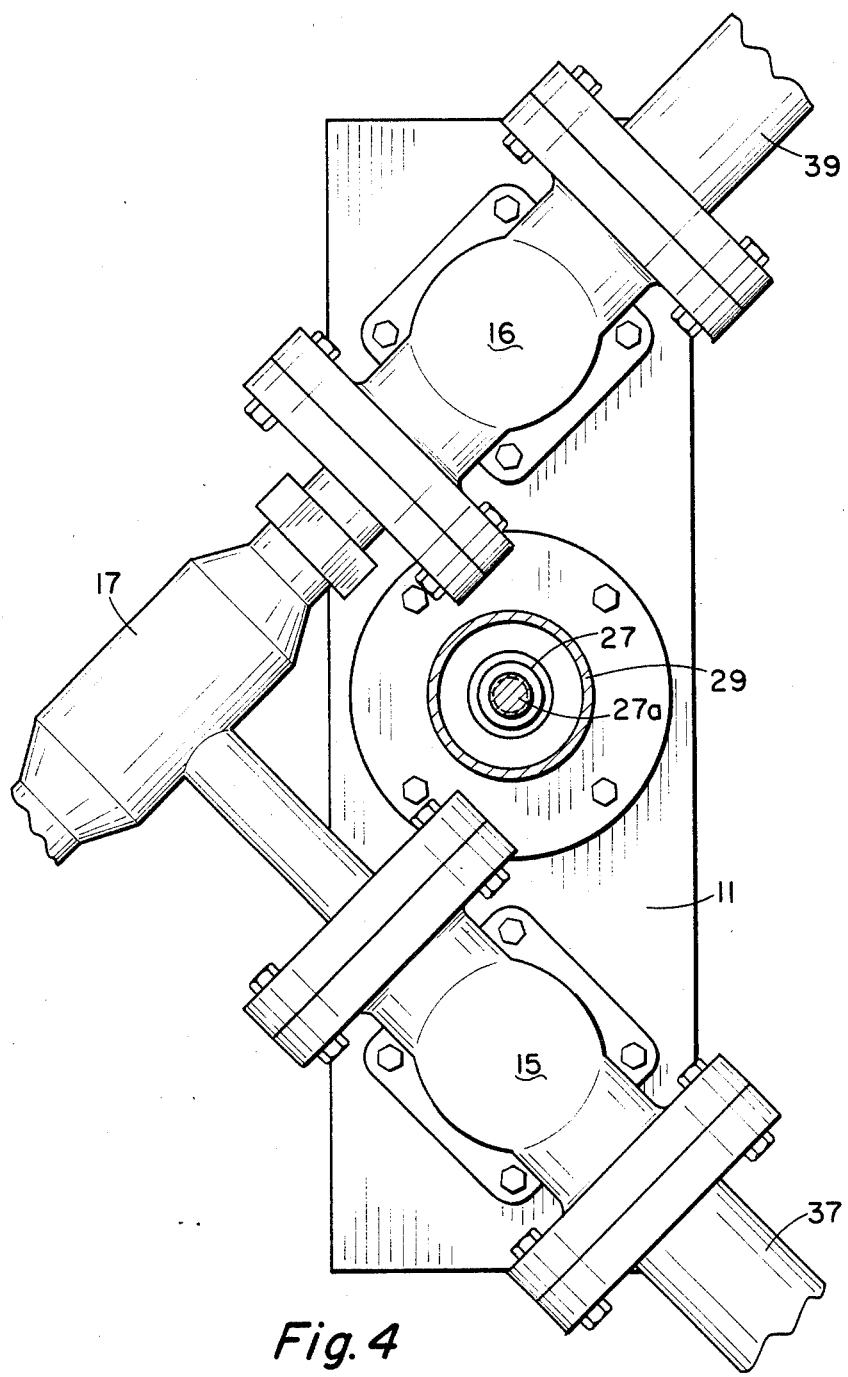
FIG. 4 is a plan view of the valve assembly, as taken on line 4—4 of FIG. 1.

Looking now at FIG. 3, the crosswise piece 23 has a lengthwise groove 23a in its outside face 23b. There is a similar lengthwise groove 24a in the outside face 24b of the crosswise piece 24. The crosswise piece 25 has a lengthwise groove 25a along its inside face 25b, and piece 26 has a similar lengthwise groove 26a along its inside face 26b. Another part of the valve assembly is an actuator unit that is capable of moving the connector member back and forth inside the valve frame. The main part of the actuator unit is a shaft 27, that is threaded at one end, as indicated at 27a (see FIG. 1), and a flange 28 is mounted near the center of the shaft.

Referring to FIGS. 1 and 3, the threaded part 27a of shaft 27 is enclosed by a bonnet member 29, which is fastened at one end to the front wall 11 of the valve frame. A handwheel 30 is threaded onto the threaded end 27a of shaft 27 and it seats down against bonnet 29. The flange 28 on shaft 27 seats into groove 25a and 26a (FIG. 3) on the center crosspiece 25 and 26, respectively. The valve assembly includes two coupler members. One of the coupler members is made up of a flange 31, with a hub 31a on one side of the flange and a hub 31b on the other side. The other coupler member consists of a flange 32, with a hub 32a on one side of the flange, and a hub 32b on the other side.

The outlet valve 15 has a valve stem 33 that fastens into the hub 31a on flange 31. On the other side of the flange the outlet valve 18 has a valve stem 34 that fastens into hub 31b. Flange 31 is designed to seat into the groove 24a (FIG. 3) on crosswise piece 24, so that valves 15 and 18 can be opened and closed by back and forth movement of the connector member. At the other end of the valve frame the inlet valve 16 has a valve stem 35 that fastens into the hub 32a on flange 32. On the other side of the flange, inlet valve 19 has a valve stem 36 that fastens into hub 32b. Flange 32 fits into groove 23a (FIG. 3) on crosswise piece 3, so that valves 16 and 19 can be opened and closed by the back and forth movement of the connector member.

A discharge line 37 is connected to the discharge valve 15 and discharge line 38 connects to the discharge valve 18. On the other side of the valve frame an inlet line 39 connects to the inlet valve 16, and another inlet line 40 connects to the inlet valve 19.

OPERATION

In a typical operation the valve assembly of this invention is mounted on the top side of a reactor vessel (not shown). The inlet lines 39 and 40 are connected to outlets in the vessel and the discharge lines 37 and 38 are connected into a flare header (not shown). The handwheel 30 can then be turned to move the connector member far enough forward to open the inlet valve 16 and the discharge valve 15, and to close the inlet valve 19 and discharge valve 8 at the same time. The pressure relief valve 17 is set at a value that does not exceed the design pressure limits for the reactor vessel.

With valves 15 and 16 in the open position and the relief valve set at a desired point, this pressure relief unit is capable of relieving any overpressure condition that may occur in the reactor vessel. For example, if the pressure inside the reactor should exceed the set point in the relief valve 17, this valve will "pop" open and release some of the pressurized fluid in the reactor into the flare header. When the pressure inside the relief valve drops below the set point, the valve will automatically close, to indicate that pressure in the reactor has returned to a safe level.

When it becomes necessary to isolate the relief valve 17, for repair, or for other reasons, the handwheel 30 can be rotated in the opposite direction to move the connector member back toward the front wall 11 of the valve frame. Movement in this direction will close inlet valve 16 and discharge valve 15, but it will open inlet valve 19 and discharge valve 18. With valves 15 and 16 closed, the relief valve 17 is isolated from the reactor vessel and the other pressure relief unit (comprising valves 18 and 19 and relief valve 20) is then in position for relieving any overpressure condition that may occur in the reactor vessel.

The invention claimed is:

1. A valve assembly for relieving pressure on a process structure, which comprises:
    a valve frame that has a front wall, a rear wall, and two end walls, that are each joined to the front and rear wall;
    a first pressure relief unit that includes a first inlet valve, a first discharge valve, and a first pressure relief valve, the inlet and discharge valves are mounted on the front wall of the valve frame, and the pressure relief valve connects the inlet valve to the discharge valve;
    a second pressure relief unit that includes a second inlet valve, a second discharge valve, and a second pressure relief valve, the inlet and discharge valves are mounted on the rear wall of the valve frame, and the pressure relief valve connects the inlet valve to the discharge valve;
    a connector member is positioned inside the valve frame;
    an actuator unit engages the connector member, and the actuator member is capable of moving the connector member back and forth inside the valve frame;
    the first and second inlet valves each have a valve stem, each valve stem is connected to a first coupler means, and the coupler means engages the connector member;
    the first and second discharge valves each have a valve stem, each valve stem is connected to a second couple means, and the coupler means engages the connector member;
    the first and second inlet valves are each connected into an inlet line that carries a fluid away from a process structure;
    the first and second discharge valves are each connected into a discharge line that carries the fluid to a disposal point; and
    wherein, in operation, the actuator unit can move the connector member to a first position that opens the first inlet and discharge valves and closes the second inlet and discharge valves, and the actuator unit can move the connector member to a second position that opens the second inlet and discharge valves, and closes the first inlet and discharge valves, so that any overpressure condition of the fluid in the process structure is relieved by allowing the fluid to pass through one of the pressure relief units to a disposal point.

2. The valve assembly of claim 1 in which:

the connector member is defined by two flat, spaced-apart bars, the bars are joined near each end by a single crosswise piece with a lengthwise groove in the outside face of each piece, the bars are joined at the center by two spaced-apart crosswise pieces, and each piece has a lengthwise groove in its inside face;

the actuator unit is defined by a shaft that has a flange mounted thereon, one end of a bonnet member is fastened to the front wall of the valve frame, the bonnet encloses part of the shaft, a handwheel is mounted on the opposite end of the bonnet, one end of the shaft is fastened to the handwheel and the flange on the shaft seats into the grooves of the center pieces on the connector member;

the first and second coupler means are each defined by a flange that has a hub member on both sides of the flange;

the valve stem on the first inlet valve is fastened into one of the hub members on the flange of the first coupler means, and the valve stem on the second inlet valve is fastened into the hub member on the opposite side of said flange;

the valve stem on the first discharge valve is fastened into one of the hub members on the flange of the second coupler means, and the valve stem on the second discharge valve is fastened into the hub member on the opposite side of said flange; and the flange on the first coupler means seats into the groove in one of the crosswise pieces positioned at one end of the connector member, and the flange on the second coupler means seats into the groove in the crosswise piece positioned at the other end of the connector member.

* * * * *